United States Patent
Mierzejewski et al.

(10) Patent No.: US 10,232,935 B2
(45) Date of Patent: Mar. 19, 2019

(54) AIRCRAFT LANDING GEAR STRUTS COATED WITH A ZINC-NICKEL ALLOY

(71) Applicant: SAFRAN LANDING SYSTEMS, Velizy Villacoublay (FR)

(72) Inventors: Sacha Mierzejewski, Velizy Villacoublay (FR); Romain Ottenio, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 427 days.

(21) Appl. No.: 15/198,156

(22) Filed: Jun. 30, 2016

(65) Prior Publication Data
US 2017/0001717 A1    Jan. 5, 2017

(30) Foreign Application Priority Data
Jul. 3, 2015 (FR) .................................. 15 56302

(51) Int. Cl.
| | |
|---|---|
| *B64C 25/36* | (2006.01) |
| *B60B 35/02* | (2006.01) |
| *C25D 3/56* | (2006.01) |
| *C21D 3/06* | (2006.01) |
| *C22C 18/00* | (2006.01) |

(Continued)

(52) U.S. Cl.
CPC .............. *B64C 25/36* (2013.01); *B60B 35/02* (2013.01); *C21D 3/06* (2013.01); *C22C 18/00* (2013.01); *C23C 22/06* (2013.01); *C23C 22/78* (2013.01); *C23C 22/82* (2013.01); *C25D 3/565* (2013.01);

(Continued)

(58) Field of Classification Search
CPC ........... B64C 25/36; B60B 35/02; C21D 3/06; C22C 18/00; C23C 22/06; C23C 22/78; C23C 22/82; C25D 3/565; C25D 5/34; C25D 5/48
See application file for complete search history.

(56) References Cited

U.S. PATENT DOCUMENTS 2,192,281 A * 3/1940 Wallace .................. B64C 25/10
                                                         244/104 FP
9,127,718 B2 * 9/2015 Barcat ................. G01D 5/24433
(Continued)

FOREIGN PATENT DOCUMENTS

EP    2 143 635 A2    1/2010

OTHER PUBLICATIONS

Mark F. Mosser et al., "Metallic-Ceramic Coatings as Replacements for Cadmium Plating", 26th Annual Aerospace/Airline Plating & Metal Finishing Forum & Exposition, Apr. 23-26, 1990, Tulsa, Oklahoma.

(Continued)

*Primary Examiner* — Justin M Benedik
(74) *Attorney, Agent, or Firm* — Sughrue Mion, PLLC

(57) ABSTRACT

Aircraft landing gear strut (1) comprising a main part (1a) extending along a main axis (X-X) of the strut and comprising an axle shaft (1b) extending in a plane (P) perpendicular to the main shaft (1a) of the strut, this axle shaft (1b) being designed to support at least one landing gear when (2a, 2b) equipped with brakes (3a, 3b) for braking the wheel, said axle shaft (1b) being made of steel. The axle shaft (1b) bears at least one layer of zinc-nickel alloy coating (C), this zinc-nickel alloy comprising, as a mass percent of the alloy, between 12% and 18% or nickel, at most 0.5% of elements other than nickel and zinc, the rest being zinc.

11 Claims, 2 Drawing Sheets

(51) Int. Cl.
*C23C 22/06* (2006.01)
*C23C 22/78* (2006.01)
*C23C 22/82* (2006.01)
*C25D 5/34* (2006.01)
*C25D 5/48* (2006.01)
*C25D 7/00* (2006.01)

(52) U.S. Cl.
CPC ................. *C25D 5/34* (2013.01); *C25D 5/48* (2013.01); *C25D 7/00* (2013.01)

(56) References Cited

U.S. PATENT DOCUMENTS

| | | | | |
|---|---|---|---|---|
| 2002/0030482 A1* | 3/2002 | Iwamoto | ................. | G01P 3/443 324/174 |
| 2008/0131721 A1* | 6/2008 | Tran | ....................... | C25D 3/565 428/613 |
| 2008/0179146 A1* | 7/2008 | Sullivan | ................... | B60L 7/26 188/164 |
| 2015/0253773 A1* | 9/2015 | Cox | ..................... | G05D 1/0083 701/3 |
| 2016/0221669 A1* | 8/2016 | Didey | ................... | B64C 25/405 |

OTHER PUBLICATIONS

Erin N. Beck, "Joint Test Report for Execution of Phase I of High Strength Steel Joint Test Protocol for Validation of Alternatives to Low Hydrogen Embrittlement Cadmium for High Strength Steel Landing Gear and Component Application—of Jul. 2003", Technical Report, Report No. NAWCADPAX/TR-2006/164, Naval Air Warfare Center Aircraft Division, Patuxent River, Maryland.

Bruce D. Sartwell et al., "Status of HCAT/JG-PP Program on Replacement of Hard Chrome Plating With HVOF Thermal Spray Coatings on Landing Gear", Paper published in Proceedings of AESF Aerospace Plating and Metal Finishing Forum, Mar. 2000, pp. 131-139.

Stephen Gaydos et al., "Evaluation of Dipsol IZ-C17 LHE Zinc-Nickel Plating", HCAT/JCAT Meeting, Jan. 24, 2007.

French Search Report with Written Opinion of FR Application No. 1556302 dated May 19, 2016.

* cited by examiner

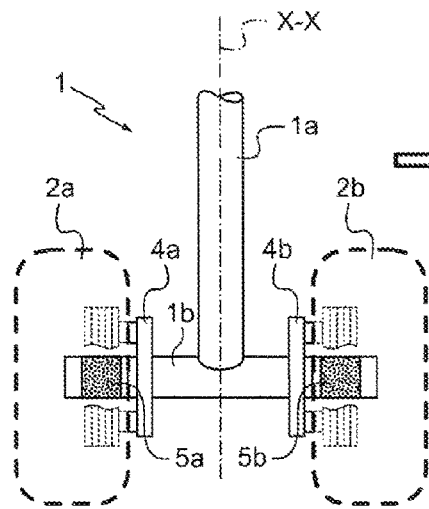
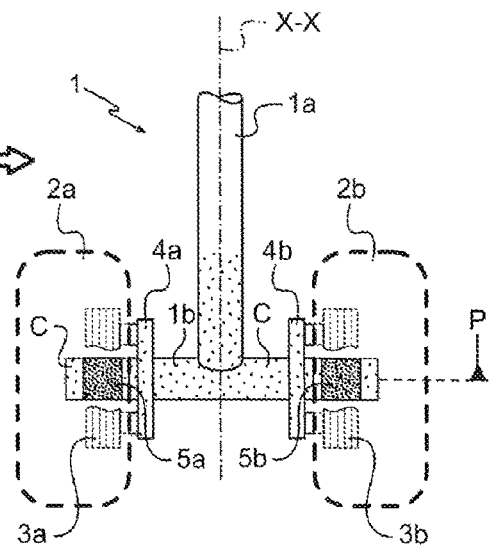
Fig. 3a          Fig. 3b
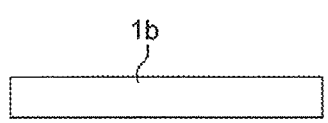
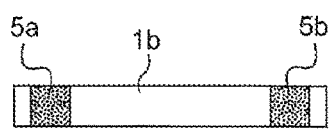
Fig. 4a          Fig. 4b
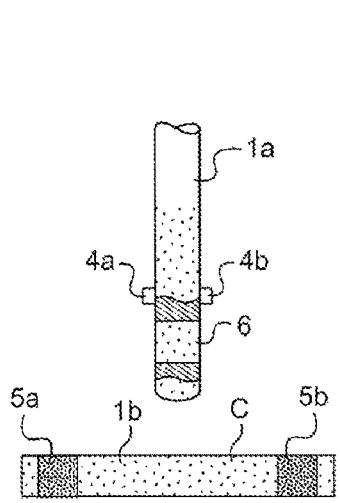
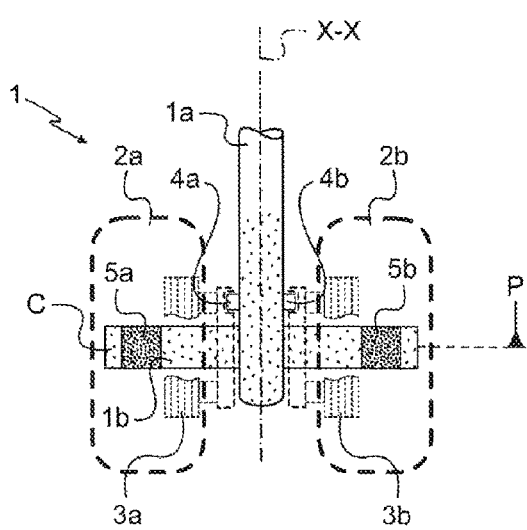
Fig. 4c          Fig. 4d

AIRCRAFT LANDING GEAR STRUTS COATED WITH A ZINC-NICKEL ALLOY

The invention relates essentially to the field of landing gear struts for aircraft and to the methods of manufacturing such landing gear struts.

BACKGROUND OF THE INVENTION

An aircraft landing gear extends from a structure of the aircraft to support wheels that support the aircraft during aircraft taxiing, take off and landing phases. Such a landing gear has a strut that needs to be strong enough to support the aircraft. At least some of the landing gear wheels are equipped with brakes for braking these wheels.

It has been found that the life of a strut and its strength over time is dependent in particular on its corrosion resistance.

In order to improve this corrosion resistance, use is systematically made of anticorrosion coatings such as cadmium.

However, it is found that the landing gear strut may weaken despite the use of these anticorrosion protections, particularly at the axles bearing the wheels equipped with brakes.

OBJECT OF THE INVENTION

On object of the present invention is to provide an alternative landing gear strut to the landing gear struts of the prior art and that has corrosion resistance.

SUMMARY OF THE INVENTION

To this end, according to one first aspect of the invention, there is proposed an aircraft landing gear strut comprising a main part extending along a main axis of the strut and comprising an axle shaft extending in a plane perpendicular to the main shaft of the strut. This axle shaft is designed to support at least one landing gear wheel equipped with brakes for braking the wheel; said axle shaft is made of steel.

The landing gear strut according to the invention is essentially characterized in that its axle shaft bears at least one layer of zinc-nickel alloy coating, this zinc-nickel alloy comprising, as a mass percent of the alloy, between 12% and 18% of nickel, at most 0.5% of elements other than nickel and zinc, the rest being zinc.

The steel of which the axle shaft is made is preferably a lightly alloyed steel and preferably a high strength steel. A lightly alloyed steel is a steel in which no additional element exceeds a content of 5% by mass of the steel. A high strength steel is a steel with a tensile strength Rm>1370 MPa (199 ksi). Such steels may, for example, be grades 300M, AISI4340, 35NCD16.

The axle shaft of the landing gear is a component that is specific in that, during use, it experiences numerous mechanical stress loadings, for example upon impacts as the aircraft lands and during braking and numerous vibrations during running.

During normal aircraft braking cycles, these mechanical stress loadings are accompanied by sharp variations in temperature of the axle shaft because it is not rare for the axle shaft to be able to exceed 200° C. and, in certain areas, come close to 300° C.

Moreover, the axle shaft which is made of steel needs to be protected against corrosion because the slightest start of corrosion is likely to give rise to weakening that may create the beginnings of a crack which, over the course of the life of the landing gear, will grow. In extreme cases, the cracking may lead to breakage of the axle shaft.

Surprisingly, it has been found that, unlike other types of coating, the use of the aforementioned zinc-nickel alloy coating formed on the steel axle shaft does not lead to a significant impairment of the mechanical strength characteristics of the axle shaft when the latter is subjected to a creep test carried out at a high temperature of between 215° C. and 300° C.

FIG. 1 illustrates a test protocol and FIG. 2 shows results of tests demonstrating that the said zinc-nickel coating is particularly well suited to protecting from corrosion an aircraft landing gear axle shaft intended to bear a wheel equipped with brakes that generate heat.

FIG. 1 illustrates the sequence of a test carried out for a given test specimen made of steel. This test involves installing the pre-notched test specimen in a tensile testing machine and subjecting this test specimen to a tensile force S the tensile force value of which increases progressively during the course of the test.

FIG. 1 shows a curve of how the tension evolves over the course of the testing time expressed in hours.

Throughout the test, the steel test specimen is kept at a constant given temperature CSTE chosen from a group of constant temperatures CSTE comprising 285° C., 315° C., 350° C., 400° C., 450° C., 500° C.

As can be seen on the abscissa axis of FIG. 1, the duration of the test may extend up to 180 hours or even beyond.

On the ordinate axis, the tensile force S applied to the test specimen for the duration of the test varies between 20% and 100% of the rupture strength of a test specimen of the bare type, which means to say a test specimen having no coating.

For the first 150 hours of the test, the test specimen tested is subjected to a tensile force S equal to 20% of its rupture strength.

Next, the tensile force is progressively increased by additional levels of 5% every two hours of testing until it reaches 100% of the rupture strength of the bare test specimen. Thus, after around 180 hours of testing, the test specimen being tested is subjected to 100% of the rupture strength of a bare test specimen.

It has been found that, in all cases in which the coating applied to the test specimen diffuses into the steel substrate of the test specimen, the test specimen tested brakes before 100% of the rupture strength value for the same test specimen but bare is reached. A significant lowering of the strength of a coated test specimen in a high-temperature creep test demonstrates that the coating is not suited to being used to protect an aircraft axle shaft against corrosion.

Surprisingly, over the range of test temperatures from 200° C. to 300° C., it was found that there are no traces of the Zn—Ni alloy diffusing into the steel substrate, even when this substrate is highly mechanically stressed in the manner of the stress loadings experienced by an aircraft axle shaft bearing wheels fitted with brakes.

FIG. 2 shows the results of tests conducted on several steel test specimens in accordance with the test protocol illustrated in FIG. 1.

The ordinate axis of FIG. 2 indicates the various constant temperatures CSTE respectively chosen for each of the tests.

The ordinate axis gives a value in MPa for the rupture strength achieved by a given test specimen undergoing the test.

The caption Rev0 denotes the results obtained with bare test specimens. Thus, with a creep test at constant temperature CSTE of 200°, the bare test specimen reaches a rupture strength of around 2500 MPa when subjected to the test protocol of FIG. 1.

It is found that the higher the temperature CSTE chosen for the test, the more the rupture strength value decreases. This rupture strength for the bare test specimen Rev0 drops from around 2500 MPa at 200° C. to around 2250 MPa at 250° C., then around 2100 MPa at 285° C., around 1900 MPa at 315° C., around 1700 MPa at 350° C., around 1400 MPa at 400° C., around 950 MPa at 450° C. and around 600 MPa at 500° C.

Thus, the more a steel test specimen creeps at a high temperature, the greater the extent to which the mechanical properties of this test specimen decrease.

The caption Rev1 denotes the results obtained with test specimens coated with an MCAC which stands for "metallic ceramic aluminium coating", namely an organic coating containing metallic aluminium.

The caption Rev2 denotes the results obtained with test specimens coated with the zinc-nickel coating used for implementing the invention.

The caption Rev3 denotes the results obtained with test specimens coated with the slightly embrittling cadmium coating (an LHE cadmium coating where LHE stands for "low hydrogen embrittlement").

It is found that of the various coatings tested, the coating Rev1 consisting of an MCAC coating and the coating Rev2 made of zinc and nickel (containing between 12 and 18% nickel and, more particularly, between 12 and 16% nickel) do not lead to a significant drop in the strength of steel test specimens for test temperatures of between 285° C. and 315° C.

By contrast, it is surprising to note that the cadmium coating Rev3 usually employed in the field of aeronautics to protect landing gear components against corrosion exhibits, from as low as 285° C., a sharp drop in the strength of the steel test specimen.

As a result, the cadmium coating is not suitable for coating a landing gear axle shaft intended to accept a wheel fitted with brakes because it is likely to cause weakness in the shaft.

By contrast, these tests demonstrate that it is particularly advantageous to protect a landing gear strut axle shaft intended to bear a wheel fitted with brakes using a zinc-nickel coating layer Rev2 according to the invention. Aside from its effect of protecting the steel substrate against corrosion, the layer of zinc-nickel alloy Rev2 does not induce a significant drop in the strength of the steel substrate and additionally offers the advantage of not containing substances that are harmful to the environment, such as the hexavalent chrome contained in the MCAC coating Rev1.

The invention also relates to an aircraft landing gear comprising:
  at least one landing gear strut according to any one of the embodiments of the landing gear strut according to the invention; and
  at least one wheel equipped with brakes and supported by the axle of the said at least one landing gear strut.

During normal aircraft braking cycles using the brakes with which the wheel is fitted, the increase in brake temperature leads to an increase in the temperature of the axle shaft. By virtue of the invention, this temperature may exceed 200° C. and approach 300° C. without there being any additional risk of impairing the strength of the axle shaft as a result of the anticorrosion protection. The landing gear according to the invention has resistance to corrosion without, however, containing environmental pollutants such as hexavalent chrome.

The invention also relates to a method of manufacturing an aircraft landing gear strut according to any one of the embodiments of the strut according to the invention. This method is essentially characterized in that it comprises:
  a step of forming an axle shaft made of steel; followed by
  a step of applying the said at least one layer of zinc-nickel alloy coating to this steel axle shaft, this application step being performed by immersing the said at least one axle shaft in an alkaline bath containing zinc and nickel in the form of ions and by applying an electrical potential between an electrode immersed in the bath and the steel axle shaft.

The use of an alkaline bath makes it possible to limit the risk of deterioration, through acid attack, of the strut during the electrolytic application of the layer of zinc-nickel alloy. Such an alkaline bath can be obtained by pouring into the bath a solution of sodium hydroxide and/or potassium hydroxide, nickel in the form of nickel sulphate, zinc in the form of zincate and complexing agents required for complexing the zinc and the nickel such as amines for example diethylene triamine and organic additives such as brighteners or levelling agents.

One advantage with this electrolytic coating method is that it makes it possible to generate on the steel of the axle shaft and on the main part of the landing gear strut, if it is covered therewith, a zinc-nickel alloy coating the thickness of which can easily be adapted to the strut, zone by zone.

Typically, the axle shaft is immersed in the bath to act as a cathode, fixed anodes immersed in the bath are used to apply coatings to exterior parts of the axle shaft requiring no special purpose tooling, other anodes constitute tools added facing zones of the axle shaft which are difficult to access, and it is possible for masks and current absorbers to be arranged locally facing the axle shaft in order to limit local overthicknesses.

This tooling made up of the anodes, masks and current absorbers makes it possible to have a uniform thickness as the coating is applied. The time taken to achieve the application of the coating and the current density required between the anodes and the axle shaft immersed in the bath define the final thickness of the zinc-nickel layer obtained.

These toolings and current-density and time parameters are adjusted so as to obtain a layer thickness of between 20 and 50 microns and preferably 20 to 30 microns. Notably by way of the aforementioned tests, and through electron microscope observations, it has been demonstrated that the layer of Zn—Ni alloy coating does not diffuse into the steel substrate when subjected to a high temperature of as much as 300° C. combined with a mechanical stress in excess of 2000 MPa being applied to this same substrate.

According to one particular embodiment of the method of manufacture of a landing gear strut according to the invention, prior to the step of applying the coating to this steel axle shaft, a step of preparing a steel surface of the strut is carried out, this step, typically degreasing followed by a mechanical or chemical surface activation, for example sand blasting, making it possible to improve the adhesion of the zinc-nickel layer.

This step makes it possible to improve the adhesion of the Zn—Ni layer to the steel.

According to one particular embodiment of the method of manufacture of the invention, after the coating step, a passivation step is carried out which consists in immersing the portions of the strut that are coated with the layer of zinc-nickel alloy coating in an acid solution containing, for example, trivalent chrome.

This passivation makes it possible to improve the anticorrosion protection conferred by the layer of Zn—Ni applied to the strut.

According to one particular embodiment of the method of manufacture of a landing gear strut according to the invention, use is made of a step of degassing any hydrogen potentially occluded in the steel, this degassing step involving placing the strut in a furnace for at least 12 hours, keeping the furnace at a temperature of 190° C. plus or minus 14° C. This degassing allows any embrittling hydrogen that may be occluded within the steel substrate to be removed.

BRIEF DESCRIPTION OF THE DRAWINGS

The invention will be better understood from reading the following description of some nonlimiting embodiments, with reference to the figures of the attached drawings among which:

FIGS. 3a and 3b show the successive steps that make it possible to obtain an aircraft landing gear strut according to the invention, the axle shaft 1b here being incorporated into the main part 1a of the strut;

FIGS. 4a, 4b, 4c, 4d depict the successive steps making it possible to obtain an aircraft landing gear strut according to the invention, in an embodiment in which the axle shaft 1b is assembled by force fitting into a complementary bore formed through the main part 1a of the strut 1.

DETAILED DESCRIPTION OF THE INVENTION

Figure 1:
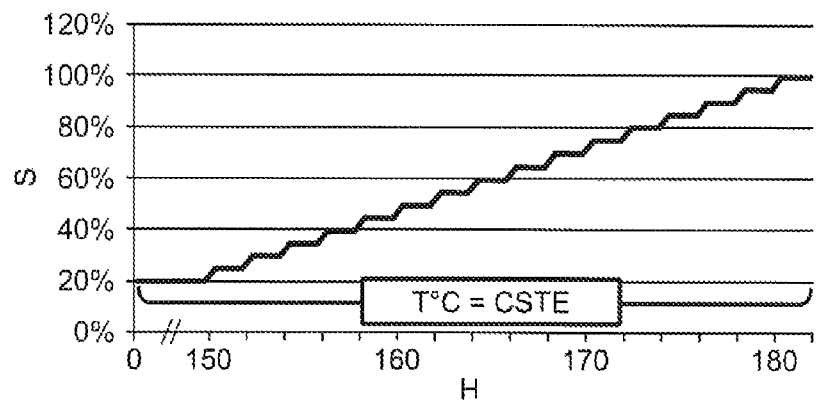
FIGS. 1 and 2 depict the aforementioned tests.
Figure 2:
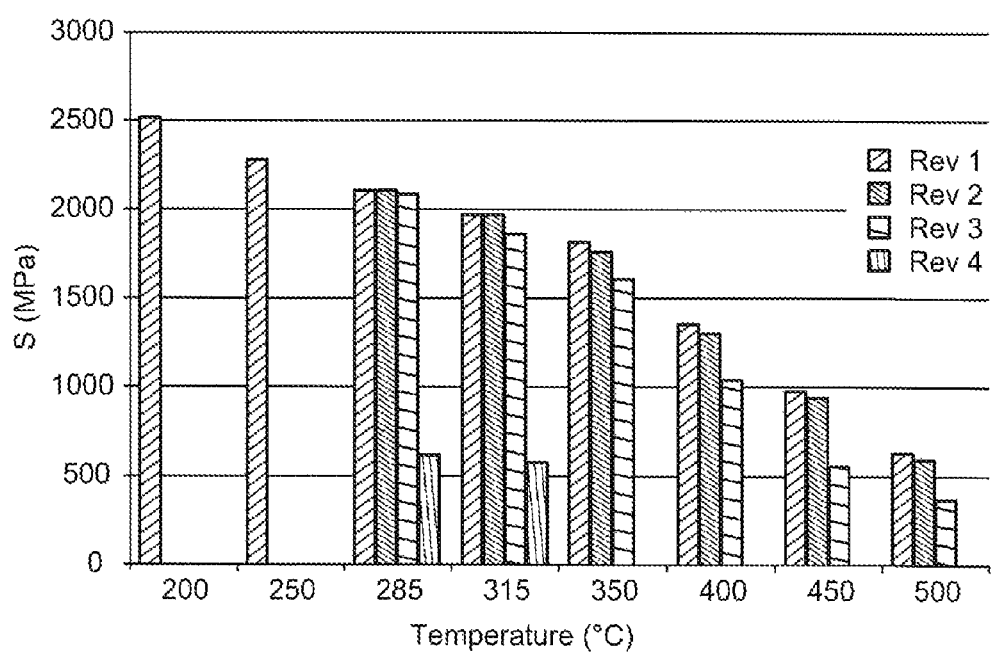

As can be seen in FIGS. 3b and 4d, the invention relates to an aircraft landing gear strut 1 comprising a main part 1a extending along a main axis X-X of the strut 1 and comprising an axle shaft 1b extending in a plane P perpendicular to the main axis 1a of the strut 1.

This axle shaft 1b is designed to support at least one landing gear wheel fitted with brakes. In this particular instance, in FIGS. 3b and 4d, the axle shaft 1b bears two wheels 2a, 2b respectively fitted with brakes 3a, 3b to brake the wheels so equipped.

The axle shaft 1b is made of steel bearing at least one layer of zinc-nickel alloy coating C, this zinc-nickel alloy containing, as a mass percent of the alloy, between 12% and 18% nickel, preferably between 12% and 16% nickel, preferably 15% nickel, to within + or −1%.

The alloy contains at most 0.5 mass percent of elements other than nickel and zinc, it being possible for these other elements to be elements that have been added deliberately or impurities. The rest of the alloy consists of zinc. Ideally, the alloy contains no alloy element other than the zinc and the nickel. In all the embodiments of the alloy, the alloy always contains at least 81.5% zinc.

The landing gear strut 1 comprises means 4a, 4b of attachment of brakes 3a, 3b designed to arrange the brakes around the axle shaft 1b so as to brake the wheels 2a, 2b of the landing gear which are fitted with brakes.

In FIGS. 1a and 1b, the attachment means 4a, 4b comprise two annular bands of the axle shaft. Each of these bands extends radially from the axle shaft 1b towards the periphery of the axle shaft. Each of these bands is perforated with holes parallel to the plane P in which the axle extends.

Each brake with which a wheel is fitted comprises a rotor secured to the wheel and a stator secured to one of the bands corresponding to it. The stator comprises discs pressed selectively by cylinders to clamp other discs belonging to the rotor. Ideally, the layer of zinc-nickel alloy covers the bands and a non-chrome-plated portion of the main part of the strut. The main part of the strut has a chrome-plated portion intended to slide inside a landing gear assembly designed to be fixed to the structure of the aircraft. This chrome-plated portion forms lands for hydraulic seals.

In FIGS. 4a and 4b, the attachment means 4a, 4b comprise protuberances extending from the sides of the main part of the landing gear strut. As in the embodiment of FIGS. 1a and 1b, each brake with which a wheel is fitted comprises a rotor secured to the wheel and a stator secured to a protuberance of the main part which corresponds to it. The stator comprises discs selectively pressed by cylinders to clamp other discs belonging to the rotor.

For preference, the layer of zinc-nickel alloy coating C extends exclusively over external surfaces of the axle shaft which are chosen to be kept at a temperature of below 300° C. when the strut is used for implementing a normal aircraft braking cycle.

Ideally, the layer of zinc-nickel alloy covers the protuberances used as attachment means 4a, 4b and all or part of the main part of the strut.

A normal aircraft braking cycle includes all the usual braking of the aircraft which takes place during aircraft taxiing, take off and landing.

A normal braking cycle does not include emergency braking likely to give rise to significant damage to the landing gear strut 1 that would require the strut to be removed and replaced or reconditioned.

As can be seen in FIGS. 3a, 3b, 4b, 4c, 4d, the axle shaft 1b comprises at least one antifriction bearing land, in this instance two lands 5a, 5b. Each land 5a, 5b is designed to accept at least one wheel antifriction bearing ring to orient the wheel about the axle shaft.

According to a first embodiment of the lands 5a, 5b, each land is formed by an annular layer of chrome formed on a steel external surface of the axle shaft 1b. The layer of zinc-nickel alloy coating extends at least over all the steel surfaces of the axle shaft that are outside of the chrome antifriction bearing lands 5a, 5b.

This embodiment makes it possible to have antifriction bearing lands that are extremely hard because they are made of chrome but at the same time have anticorrosion protection compatible with high-temperature axle operation.

According to this embodiment, each antifriction bearing land 5a, 5b made of chrome extends between two annular edges made of chrome specific to it. The layer C of zinc-nickel alloy coating which extends outside of the lands 5a and 5b also extends over the annular edges made of chrome of each of these lands 5a, 5b.

The fact that the layer C of zinc-nickel alloy coating covers all the edges of the chrome lands makes it possible to limit the risk of seeing corrosion at the annular edges of the annular lands made of chrome.

Ideally, the main part 1a of the landing gear strut 1 is made of steel and the layer of zinc-nickel alloy coating extends over at least a portion of this main part 1a, this layer being formed against the steel of the landing gear strut. This then avoids the risk of corrosion at the interface between the axle 1b and the main part 1a.

Finally, whereas in FIGS. 3a and 3b the main strut 1a and the axle shaft 1b form one and the same component, in FIGS. 4a, 4b, 4c and 4d it may be seen that the axle shaft 1b and the main strut 1a form two distinct components assembled by force fitting.

FIGS. 4a to 4d illustrate the method of manufacturing the landing gear strut in two parts.

In FIG. 4a, the shaft 1b is bare and does not yet have its antifriction bearing lands.

In FIG. 4b, the antifriction bearing lands 5a, 5b are formed.

FIG. 4c shows the axle shaft 1b and the main part 1a of the strut before these components are assembled. A bore 6 is formed through the main part 1a. The layer C of Zn—Ni alloy is formed on the axle shaft 1 and on the main part 1a, including on the inside of the bore 6 before the axle shaft 1b is assembled with the main part 1a of the strut 1.

FIG. 4d shows the axle shaft 1b assembled with the main part 1a of the strut.

In this case, the axle shaft extends through the bore 6 that passes through the main part of the landing gear strut. This axle shaft 1b is tightly fitted into this bore 6 and a continuous annular portion of the layer C of zinc-nickel alloy coating borne by the axle shaft forms an interface between the internal annular surface of the said bore 6 and a longitudinal portion of the axle shaft 1b extending into the bore.

Thus, the continuous annular portion of the layer C which extends into the bore 6 forms an interface between the bore and the steel of the axle shaft. This interface provides anticorrosion protection for the axle shaft while at the same time allowing the layer C to deform during the force-fitting of the axle shaft 1b into the bore 6. This then limits the risk of empty spaces appearing between the internal annular surface of the bore and the axle shaft. The fact that the formation of such empty spaces is limited limits the clearances and vibrations between the main part 1a and the axle shaft 1b and the risk of peening and oxidation when the landing gear strut is in service. The causes of weakening and embrittlement of the landing gear strut are thus minimized.

Finally, as can be seen in FIG. 4c, the internal annular surface of the bore 6 may bear an annular layer inside the bore, this annular layer inside the bore being made of the same zinc-nickel alloy.

The invention claimed is:

1. An aircraft landing gear strut (1) comprising:
a main part (1a) extending along a main axis (X X) of the strut and comprising an axle shaft (1b) extending in a plane (P) perpendicular to the main shaft (1a) of the strut, the axle shaft (1b) being designed to support at least one landing gear wheel (2a, 2b) equipped with brakes (3a, 3b) for braking the wheel, said axle shaft (1b) being made of steel,
wherein the axle shaft (1b) has at least one layer of zinc nickel alloy coating (C), the zinc nickel alloy comprising, as a mass percent of the alloy, between 12% and 18% of nickel, at most 0.5% of elements other than nickel and zinc, the rest being zinc,
wherein the axle shaft (1b) comprises at least one bearing seat (5a, 5b) designed to accept at least one wheel bearing ring, each said at least one bearing seat (5a, 5b) being formed by an annular layer of chrome formed on an external surface made of steel of the axle shaft (1b), the at least one layer of zinc nickel alloy coating extending at least over all the steel surfaces of the axle shaft that are situated outside of the said at least one bearing seat made of chrome (5a, 5b), and
wherein each at least one bearing seat (5a, 5b) made of chrome extends between two chrome annular edges specific to it, the at least one layer of zinc nickel alloy coating extending over the annular edges made of chrome of each at least one bearing seat.

2. The aircraft landing gear strut according to claim 1, in which the said at least one layer (C) of zinc nickel alloy coating extends exclusively over external surfaces of the axle shaft which are chosen to be kept at a temperature of below 300° C. when the strut is used for performing a normal aircraft braking cycle.

3. The aircraft landing gear strut according to claim 1, in which the axle shaft (1b) extends through a bore (6) that passes through the main part of the landing gear strut, this axle shaft being tightly fitted into this bore (6), and a continuous annular portion of the layer of zinc nickel alloy coating (C) borne by the axle shaft (1b) forms an interface between the internal annular surface of the said bore (6) and a longitudinal portion of the axle shaft which extends into the bore (6).

4. The aircraft landing gear strut according to claim 3, in which the said internal annular surface of the bore bears an annular layer internal to the bore (6), this annular layer internal to the bore (6) being made of the same zinc nickel alloy.

5. The aircraft landing gear strut according to claim 1, in which the main strut and the axle shaft are formed as a single piece.

6. The aircraft landing gear strut according to claim 1, in which the zinc nickel alloy contains, as a mass percentage of the alloy, between 12% and 16% nickel.

7. An aircraft landing gear comprising:
at least one landing gear strut (1) according to claim 1;
at least one wheel (2a, 2b) equipped with brakes (3a, 3b) and supported by the axle (1b) of the said at least one landing gear strut (1).

8. A method of manufacturing a landing gear strut (1) for an aircraft according to claim 1, characterized in that it comprises:
a step of forming an axle shaft (1b) made of steel; followed by
a step of applying the said at least one layer of zinc nickel alloy coating (C) to this steel axle shaft (1b), this application step being performed by immersing the said at least one axle shaft in an alkaline bath containing zinc and nickel in the form of ions and by applying an electrical potential between an electrode immersed in the bath and the steel axle shaft.

9. The method of manufacturing a landing gear strut according to claim 8, in which prior to the step of applying the coating to this steel axle shaft, a step of preparing a steel surface of the strut, comprising chemical or mechanical surface activation, is carried out.

10. Method of manufacturing a landing gear strut according to claim 8, in which, after the coating step, a passivation step is carried out which consists in immersing the portions of the strut that are coated with the layer of zinc nickel alloy coating in an acid solution.

11. The method of manufacturing a landing gear strut according to claim 8, further comprising a step of degassing any hydrogen potentially occluded in the steel, this degassing step involving placing the strut in a furnace for at least 12 hours, keeping the furnace at a temperature of 190° C. plus or minus 14° C.

* * * * *